April 14, 1959 — L. P. DEIS — 2,881,617
PRESSURE MEASURING INSTRUMENT
Filed May 20, 1957
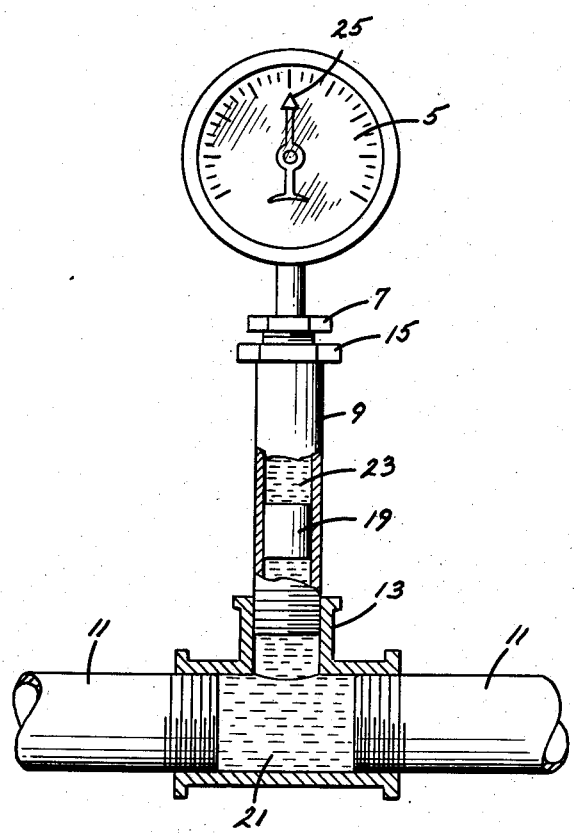

2,881,617
PRESSURE MEASURING INSTRUMENT

Louis P. Deis, Westtown, Pa., assignor to American Viscose Corporation, Philadelphia, Pa., a corporation of Delaware Application May 20, 1957, Serial No. 660,378

9 Claims. (Cl. 73—395)

The invention relates to pressure measuring mechanisms, and particularly to means for transmitting the pressure fluctuations of a heated fluid to a pressure indicating device.

To protect the delicate mechanisms of pressure gauges from contamination, as for example when measuring corrosive or abrasive fluids, it is common practice to interpose a pressure transmitting means between the gauge and the fluid undergoing measurement. In effect, the pressure transmitting means serves to physically separate the gauge mechanism from the fluid being measured, and most commonly consists of a piston or diaphragm which is responsive to the pressure fluctuations of the fluid. These known constructions, however, have proven to be unsatisfactory when the fluid being measured undergoes wide temperature and pressure variations. Further, when measuring heated fluids which have a tendency to solidify upon cooling, it is apparent that the pressure measurements must be made without diverting the fluid from its normal path, and without appreciably reducing its temperature from the desired range. Accordingly, a primary object of this invention is to provide a generally improved and more satisfactory pressure transmitting means.

Another object of the invention is to provide a pressure responsive piston which physically separates the fluid undergoing measurement from the pressure indicating device, and which is uniformly accurate under wide ranges of temperatures and/or pressure.

Still another object is the provision of a pressure measuring device having a piston which is readily liquefied by the heat of the fluid being measured, and which expands upon cooling to provide a fluid-tight seal, as for example during the shutdown of the apparatus.

A still further object of the invention is the provision of a pressure measuring device having a metallic piston that is molten at the temperature of operation, and which solidifies, with an increase in volume, at a temperature slightly above that of the fluid being measured.

These and other objects and advantages of the invention will be apparent from the following description and the single figure of the drawing which illustrates the pressure transmitting means of the present invention in its position of normal use, with portions of the assembly shown in section.

In general, the present invention relates to a pressure indicating device having a piston which physically separates the fluid undergoing measurement from the pressure indicating gauge itself. The pressure indicating device is particularly suited for use in measuring the pressure of heated fluids wherein the piston, preferably formed of metal, assumes a molten condition during operation and serves to accurately transmit pressure fluctuation to an indicating gauge. In its molten condition, the pressure transmitting function of the piston is not impaired by the temperature and pressure variations to which the fluid being measured may be subjected. During a shutdown of the fluid system, the piston solidifies at a temperature slightly above that of the fluid being measured and is accompanied by a small increase in volume to satisfactorily seal the pressure indicating device from the remainder of the system.

Referring more particularly to the drawing, the device of the present invention includes a conventional pressure indicating gauge 5 connected by the lock nut 7 to one end of the adaptor 9, which in turn is connected to fluid delivery conduits 11 by the T-coupling 13. For ease of assembly, the adaptor 9 is provided with a polygonally shaped flange as shown at 15. The piston of the present invention, indicated at 19, assumes a molten state during operating conditions under the heat of the fluid 21 delivered through the conduits 11, and moves vertically within the adaptor 9 in response to the pressure fluctuations, as more fully described hereafter. The movements of the piston 19 are transmitted to a hydraulic fluid 23, as for example oil, which in turn actuates the pressure indicating arm 25, as in conventional pressure indicating devices. Valves, not illustrated are provided on the gauge 5 for evacuating the area above the piston 19 simultaneously with the introduction of hydraulic fluid 23 into this space in the usual and known manner.

To maintain the fluids 21 and 23 separated from each other, the piston 19 is desirably formed of a material having a specific gravity intermediate the specific gravities of the fluids 21 and 23, but greater than that of the hydraulic fluid 23. When the fluid 21 undergoing measurement is of an extremely viscous character; that is having a consistency of a stiff or semi-plastic material, it has been discovered that the molten piston 19 actually rests upon and is supported by the fluid 21 without any substantial intermixture between these materials. Under these conditions, the relationship between the specific gravity of the fluid 21 and that of the piston 19 is not too critical. In effect, the specific gravity of the material forming the piston may be greater than that of the fluid undergoing measurement without impairing either the accuracy or the reliability of the apparatus.

In preparing the device for use, the fluid 21 is passed through the conduit 11 under little or no pressure and the piston forming material, in a molten condition, is introduced into the adaptor 9. The gauge 5 is now attached to the adaptor 9 by the lock nut 7 and the hydraulic fluid 23 is introduced in the conventional manner. The fluid 21 is now delivered through the conduit 11 under its normal operating conditions and the pressure thereon, as transmitted by the piston 19, is indicated by the arm 25 of the gauge 5.

As heretofore mentioned, the present invention is particularly suited for use in measuring the pressure on heated fluids. It will be understood, however, that the invention is not limited to any specific temperature range but requires only that the temperature of the fluid undergoing measurement be sufficient to melt the piston forming material. Preferably, the piston material has a solidification temperature slightly below the freezing point of the material undergoing measurement, with its solidification being accompanied by a small increase in volume. The change in size of the piston as it is transformed into its solid state is especially beneficial during a shutdown of the fluid system since the piston then snugly engages with the internal walls of the adaptor to provide a fluid-tight seal at this location. This arrangement not only permits an apparatus shutdown without taking any particular precautions, but in addition leaves the apparatus in condition for further use when desired.

In view of the above description, it is apparent that the teachings of the present invention are adapted for wide use under various operating conditions. As an example, the present invention has been successfully employed in measuring the pressure of a molten polymer, namely polyethylene, during an extrusion process. During this particular trial, the polyethylene was heated to a temperature ranging from 266–275° F., where it assumed a molten but extremely viscous character. In this condition, the polyethylene had a specific gravity of 0.753 gm./cm.$^3$ (gram per cubic centimeter) as compared to 0.965 gm./cm.$^3$ in its solid form. As a pressure transmitting means or piston, a bismuth-tin eutectic alloy was found most suitable and is commercially available under the trademark of Cerrotru, a product of Cerro Depasco Corporation. This piston forming material has a melting point of approximately 200° F. and possesses the desirable characteristic of expanding as it solidifies. In view of the high temperatures involved, a silicon oil, commercially available under the name of Dow Cornings Silicone Oil No. 710, was employed as the pressure transmitting means between the piston and the gauge itself. The silicon oil has a specific gravity of approximately 1.10 gms./cm.$^3$ and thus posed no problem of intermixing with the piston forming material. While the bismuth-tin eutectic alloy had a specific gravity considerably higher than the polyethylene, the stiff nature of the polyethylene provided satisfactory support for the molten diaphragm without any appreciable intermixture of these materials taking place. In addition to providing the desired pressure measurements, which were not heretofore available with conventional equipment, it was observed that during a shutdown and the resulting cooling of the apparatus, the piston solidified from its molten condition slightly before the polyethylene and that this solidification was accompanied with an increase in the piston volume. This aspect of the operation was highly important since an effective seal was provided between the silicon oil and the polyethylene, the latter of which has a tendency to contract upon cooling.

By the teachings of the present invention, it is now possible to obtain accurate pressure measurements of heated fluids, notwithstanding any temperature and/or pressure fluctuation which may be encountered. Further, it will be apparent that the indicating gauge and its hydraulic fluid are free from contamination and that no special precaution need be taken when the apparatus is shut down.

It is seen from the above description that the objects of the invention are well fulfilled by the structure described. The description is intended to be illustrative only and it is to be understood that changes and variations may be made without departing from the spirit and scope of the invention as defined in the appended claims.

I claim:

1. A pressure indicating device including a tubular member, means for securing one end of said member to a source of fluid under pressure, a pressure indicating gauge connected to the opposite end of said member, and a piston disposed within said member in spaced relationship with said gauge to provide a chamber therebetween for a hydraulic liquid, said piston being in a molten state under operating conditions.

2. A pressure indicating device including a tubular member, means for securing one end of said member to a source of fluid under pressure, a pressure indicating gauge connected to the opposite end of said member, and a piston disposed within said member in spaced relationship with said gauge to provide a chamber therebetween for a hydraulic liquid, said piston being formed of a material having a melting point at a temperature not greater than that of the fluid undergoing measurement and thereby rendered in a molten condition during operation.

3. A device as defined in claim 2 wherein said piston forming material has a freezing point slightly above that of the fluid undergoing measurement to permit the same to solidify as said fluid is cooled.

4. A device as defined in claim 3 wherein said piston forming material expands in volume as it solidifies.

5. A device as defined in claim 2 wherein said piston forming material has a specific gravity greater than that of the hydraulic liquid.

6. A pressure indicating device including a tubular member, means for securing one end of said member to a source of heated fluid under pressure, a pressure indicating gauge connected to the opposite end of said member, and a piston disposed within said member in spaced relationship with said gauge to provide a chamber therebetween for a hydraulic liquid, said piston being formed of a material rendered molten under operating conditions by the heat of the fluid under pressure and having a freezing point slightly above that of the fluid under pressure.

7. A device as defined in claim 6 wherein said piston forming material expands in volume as it solidifies from a molten condition.

8. A device as defined in claim 7 wherein said piston forming material has a specific gravity greater than the hydraulic liquid.

9. A device as defined in claim 8 wherein said piston is formed of a bismuth-tin eutectic alloy.

References Cited in the file of this patent

UNITED STATES PATENTS

| 161,422 | Mahoney | Mar. 30, 1875 |
| 945,978 | Neilsen et al. | Jan. 11, 1910 |
| 1,422,485 | Shephard | July 11, 1922 |
| 2,566,369 | Putman | Sept. 4, 1951 |